US012763343B2

(12) United States Patent
Rastegar

(10) Patent No.: US 12,763,343 B2
(45) Date of Patent: Oct. 13, 2026

(54) EXOTHERMIC-BASED COMPOSITE STRUCTURES AND THERMAL BATTERIES HAVING THE SAME

(71) Applicant: Omnitek Partners LLC, Ronkonkoma, NY (US)

(72) Inventor: Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 819 days.

(21) Appl. No.: 17/992,387

(22) Filed: Nov. 22, 2022

(65) Prior Publication Data

US 2024/0120505 A1 Apr. 11, 2024

Related U.S. Application Data

(63) Continuation-in-part of application No. 17/103,600, filed on Nov. 24, 2020, now Pat. No. 11,664,505.

(60) Provisional application No. 62/940,193, filed on Nov. 25, 2019.

(51) Int. Cl.

| | |
|---|---|
| ***H01M 6/50*** | (2006.01) |
| ***H01M 6/36*** | (2006.01) |
| ***H01M 10/615*** | (2014.01) |
| ***H01M 10/658*** | (2014.01) |
| ***H01M 10/659*** | (2014.01) |
| ***H01M 50/112*** | (2021.01) |
| ***H01M 50/138*** | (2021.01) |

(52) U.S. Cl.

CPC .......... *H01M 6/5038* (2013.01); *H01M 6/36* (2013.01); *H01M 10/615* (2015.04); *H01M 10/658* (2015.04); *H01M 10/659* (2015.04); *H01M 50/112* (2021.01); *H01M 50/138* (2021.01)

(58) Field of Classification Search

CPC .... H01M 6/5038; H01M 6/36; H01M 10/615; H01M 10/658; H01M 10/659; H01M 50/112; H01M 50/138

See application file for complete search history.

(56) References Cited

U.S. PATENT DOCUMENTS

| | | | | |
|---|---|---|---|---|
| 3,132,971 A * | 5/1964 | Selis | H01M 6/36 429/219 |
| 3,554,181 A * | 1/1971 | Gawlick | F24V 30/00 126/263.01 |
| 3,625,767 A * | 12/1971 | Clark | H01M 6/36 429/112 |
| 3,972,730 A * | 8/1976 | Bowers | H01M 12/06 429/103 |

(Continued)

FOREIGN PATENT DOCUMENTS

| | | | | |
|---|---|---|---|---|
| CN | 108878917 A * | 11/2018 | H01M 6/36 |
| FR | 2000723 A1 * | 1/1969 | H01M 6/36 |
| GB | 1203782 A * | 9/1970 | F24V 30/00 |

*Primary Examiner* — Kaity V Chandler

(57) ABSTRACT

An energy storage system including: an energy storage device including a battery core and outer casing; and a heating device at least partially surrounding an outer periphery of the battery core. The heating device includes: a first compartment having a heating pyrotechnic material disposed therein; and a second compartment having a phase changing material disposed therein. Where the first compartment has a first surface that contacts at least a portion of a second surface of the second compartment.

16 Claims, 12 Drawing Sheets

(56) References Cited

U.S. PATENT DOCUMENTS

| | | | | | |
|---|---|---|---|---|---|
| 5,006,429 | A * | 4/1991 | Pracchia | H01M 6/36 | 429/103 |
| 5,100,170 | A * | 3/1992 | Mihm | F42B 39/14 | 280/736 |
| 5,206,456 | A * | 4/1993 | Pracchia | H01M 6/36 | 102/207 |
| 10,312,526 | B1 * | 6/2019 | Thomas | H01M 6/36 | |
| 2002/0041173 | A1 * | 4/2002 | Velez | H01M 10/39 | 320/101 |
| 2003/0017382 | A1 * | 1/2003 | Machado | H01M 6/14 | 429/231.95 |
| 2012/0301754 | A1 * | 11/2012 | Rastegar | H01M 6/36 | 429/90 |
| 2013/0344356 | A1 * | 12/2013 | Rastegar | H01M 6/36 | 429/61 |
| 2014/0013983 | A1 * | 1/2014 | Rastegar | F42C 1/04 | 102/216 |
| 2015/0147601 | A1 * | 5/2015 | Rastegar | H01M 6/5038 | 429/48 |
| 2016/0233521 | A1 * | 8/2016 | Rastegar | H01M 50/70 | |
| 2017/0040619 | A1 * | 2/2017 | Rastegar | H02N 2/18 | |
| 2018/0013152 | A1 * | 1/2018 | Rastegar | H02N 2/181 | |
| 2019/0017795 | A1 * | 1/2019 | Shaw | C06B 33/00 | |
| 2019/0363336 | A1 * | 11/2019 | Rastegar | H01M 50/70 | |

* cited by examiner

EXOTHERMIC-BASED COMPOSITE STRUCTURES AND THERMAL BATTERIES HAVING THE SAME

CROSS REFERENCE TO RELATED APPLICATIONS

This application is a Continuation-In-Part Applications of U.S. patent application Ser. No. 17/103,600, filed on Nov. 24, 2020, which claims benefit to U.S. Provisional Application No. 62/940,193 filed on Nov. 25, 2019, the contents of each of which are incorporated herein by reference.

BACKGROUND

1. Field

The present disclosure is directed to exothermic-based composite structures and more particularly to exothermic-based composite structures for use in liquid reserve batteries and even more particularly, to such liquid reserve batteries for use in munitions.

2. Prior Art

Munitions can be hand emplaced or gun launched. Munitions may be stored for up to 20 years in different environments, including at very low temperatures. In all situations, munition components need to be fully operational at temperatures that may be as low as −55 degrees C. Proper operation of munition components, particularly for munition reserve power systems, is critical to all missions at such low temperatures. For example, when munitions are launched at very low temperatures or are emplaced and must be operational at such low temperatures, methods to heat their reserve power system components quickly to allow their activation and to make them fully operational becomes critical. In addition, many sensitive sensory systems and their electronics do not function within the required range at very low temperatures.

Different methods of heating various mechanical, electrical, electronic and optical components at very low temperatures, such as in space or in very cold environments have been developed. In almost all such applications, electrical energy is the main source of heat and is also used to keep the source of electrical energy itself warm and operational. When the source of electrical energy is combustion of fuel, the waste heat is also used for keeping the system components at operational temperature.

The above methods, however, are not suitable for munitions for several reasons. Firstly, munitions are not generally provided with external power sources that can be used to heat the onboard components at low temperatures before firing. In addition, such heating processes are not suitable for munitions since they would take a relatively long time and munitions must be readied for firing very rapidly. Secondly, the added heating components such as electrical heating components with the required wiring and electrical insulations and support structures would occupy a significant amount of valuable munitions volume, thereby significantly degrading their effectiveness and lethality.

SUMMARY

An objective is to provide exothermic-based composite structures that are load bearing and possess sufficient mechanical properties to withstand setback launch accelerations of up to 75,000 Gs and high spin rates of up to 200 Hz and their generated forces in gun-fired munitions and to provide adaptive heating on-demand for thermal management of munitions components, such as power sources at low temperatures so as to significantly extend the run-time and high-pulsed power of reserve power systems for gun-fired munitions and extend the stand-off range, thus improving safety for soldiers.

The exothermic-based composite structures disclosed herein are load carrying and can be configured to withstand gun firing and flight spin induced forces to eliminate the need for support and shock hardening structures and elements. For such applications, exothermic materials are used as a heating source due to their high heat generating capacity and very fast response even at temperatures as low as −55 degrees C.

The exothermic-based composite structures can be configured to function as "heating blankets" for temperature sensitive components, such as power sources, which after exhausting their heating sources, would function as effective thermal insulation to keep the components warm at low temperatures.

A variation of the exothermic-based composite structures can employ phase change members in its structure to efficiently store heat energy that is generated by high temperature burning of pyrotechnics materials to provide a relatively uniform heating source at a predictable temperature that is significantly lower than peak pyrotechnic burning temperatures and that can be maintained significantly longer.

The occurrence of low temperatures in an operational environment is not predictable and for applications such as in emplaced munitions that have to be operational over a 30 day period, low temperatures that affect the munitions power system and other temperature sensitive components may occur at different times and last different amounts of time. For this reason, the exothermic-based composite structures can adaptively provide the required amount of heat on demand for thermal management of munitions components such as power sources at low temperatures.

Similar activation at low temperatures and high-power pulses can be provided to reserve power systems and temperature sensitive components of all gun-fired munitions, rockets and missiles at very low temperatures.

The adaptive heating capability of the load carrying exothermic-based composite structures can achieve the objective of significantly extending the run-time and high-pulsed power of reserve power systems for gun-fired munitions and extend the stand-off range without sacrificing munitions lethality, thus improving safety for soldiers.

Performance characteristics of the exothermic-based composite structures with adaptive heating on demand capabilities include:

1. The exothermic-based composite structure can be load bearing and possess sufficient mechanical properties to withstand setback launch and spin generated forces in gun-fired munitions, an therefore, do not require additional munitions volume to perform their adaptive heating of reserve power sources and other low temperature sensitive components of munitions on demand.

2. The exothermic-based composite structures can be configured to provide adaptive heating on-demand for thermal management of munitions components, such as reserve power sources and other temperature sensitive components, at low temperatures that may be as low as −55 degrees C.

3. The exothermic-based composite structures may be configured with phase change members to efficiently store heat energy that is generated by high temperature burning of pyrotechnic materials to provide a relatively uniform heating source at a predictable temperature that is significantly lower than peak pyrotechnic burning temperatures and that can be maintained significantly longer.

4. Since the occurrence of low temperatures in an operational environment is not predictable, particularly for munitions that are operational for many days, such as emplaced munitions that have to be operational over a 30 days period, the exothermic-based composite structures can be configured to be capable of adaptively providing the required amount of heat on demand to achieve the desired thermal management goals of the munitions components as it is subjected to the effects of low temperatures.

5. The exothermic-based composite structure can be provided with sensory and activation mechanisms to achieve the capability of adaptively providing heat to the components that their performance is on the verge of being negatively affected due to low temperature.

6. The exothermic-based composite structures can be used to rapidly heat reserve power sources at low temperatures to bring them to their peak operational capabilities to provide high-power pulses on demand.

7. The exothermic-based composite structures can be configured in any desired shape and size to adapt to the available volume and shape of the reserve power sources to optimize their thermal management functionality in terms of maximizing the run-time of performance level of the power sources.

8. By providing load bearing exothermic-based composite structures, the need for additional support structures and means of shock loading hardening may be eliminated or at least reduced. Thereby, additional valuable munitions volume does not need to be occupied.

9. The exothermic-based composite structure can also be fabricated as flexible members, for example, in the form of fabric like sheets, plates, bars, relatively thin fibers, etc., that could conform to the target component geometry and also provide the required distribution of the heating source to achieve optimal system performance.

The use of exothermal materials, such as pyrotechnic materials, that can rapidly provide heat or materials that undergo slower chemical reaction and thereby provide heat at much slower rates are used in munitions for providing heat at the required rate to various munitions components. Such exothermal materials are used as a heat source for munitions since they can heat the intended component very rapidly; they are for one-time use and for a relatively short period of time; and they can be activated without requiring outside power.

The exothermic-based composite structure can perform their intended heating of the munition temperature sensitive components adaptively and on demand at low temperatures to ensure their optimal performance.

The exothermic-based composite structure can be configured to be load bearing and possess the necessary mechanical properties to withstand setback launch and spin generated forces in gun-fired munitions so that no additional munitions volume is needed to be occupied.

The exothermic-based composite structure can be used for adaptive heating on-demand for thermal management of munitions reserve power sources and other temperature sensitive components at low temperatures that may be as low as −55 degrees C.

The exothermic-based composite structure can be used for the configuration of reserve power system assembly of hand emplaced munitions systems to make it possible to activate the munitions at very low temperatures and provide the required high-power pulses during individual missions. The same can be similarly used for activation at low temperatures and high-power pulses in gun-fired munitions, rockets and missiles at very low temperatures.

The exothermic-based composite structure can also be fabricated as flexible members, for example, in the form of fabric like sheets, plates, bars, relatively thin fibers, etc., that can conform to the target component and available geometry and also provide the required distribution of the heating source to achieve optimal system performance.

The exothermic-based composite structure can be configured with structures and materials that turns them into very effective thermal insulation materials following heat generation function.

The exothermic-based composite structures can support miniaturization of munitions electronics and munitions power sources and can provide managed and controlled heat rates.

The exothermic-based composite structures can withstand setback accelerations of over 75,000 Gs and high spin rates of up to 200 Hz and satisfy the military shelf life requirement of 20 years.

In addition, since the exothermic-based structures can be used for thermal management of temperature sensitive components of munitions, such as their power sources, the composite structure can have very low thermal conductivity. In addition, the exothermic materials used in construction of the composite structure can have low thermal conductivity before and after it has performed its heat generating function.

In addition, the exothermic heating sources can be distributed within the developed composite structure and can be initiated as needed to achieve the desired, i.e., to function as an adaptive thermal management system.

The occurrence of low temperatures in an operational environment is not predictable and for applications, such as in emplaced munitions that have to be operational over a 30 days period, low temperatures that affect the munitions power system and other temperature sensitive components may occur at different times and last different amounts of time. Therefore, the exothermic-based composite structures can be provided with sensory devices, such as, passive sensory devices, that would make the composite structure capable of adaptively providing the required amount of heat to the affected devices, such as the power sources for their thermal management and when high-power pulses are needed at low temperatures.

Highly effective thermal insulation materials can be used in power sources such as thermal batteries that operate at temperatures that can be over 600 degrees C. For example, an aerogel material, reinforced with ceramic fibers and particles. The insulation material may be relatively flexible sheets, such as, Fiberfrax Ceramic Fiber Paper, which are flexible enough to conform to smooth corners. In general, the flexible insulation materials can be fabricated into relatively thin sheets of even sub-millimeters. In the below description, a composite structure with several layers of multiple patterned pyrotechnic "strands" that can be initiated separately are described.

The composite structures can be configured to almost any size and shape to conform to the surface of the object to be covered. The composite structures can be relatively rigid for applications in which they have to bear load or may be relatively flexible for applications in which they must be "wrapped" around the intended object without requiring a significant load bearing capability.

It is appreciated by those skilled in the art that in reserve battery thermal management applications of the disclosed exothermic-based composite structures, particularly in thermal reserve battery applications in which the exothermic-based composite is used to provide a housing within which the battery core is packaged, the battery core should be protected from hot spots with temperatures that would damage the battery core components. In general, high temperatures composite structures are desired to maximize the amount of time that the battery core stays above its minimum operating temperature, i.e., above the melting temperature of the battery electrolyte in case of thermal reserve batteries. However, the exothermic-based composite structures that generate regions or spots of very high temperatures would damage the battery core material and are therefore undesirable.

It is also appreciated by those skilled in the art that for the case of thermal reserve batteries, the provision of the exothermic-based composite structures used to generate heat around the battery core to keep its electrolyte from solidifying as it cools is more effective in increasing the battery run-time for smaller volume batteries. This is the case since the smaller the volume of the battery, the smaller the surface area they would have relative to the battery volume, i.e., they would have larger battery core surface area to provide heating fuse strips, but they need to keep a much larger volume of the battery core to keep warm. As a result, when a battery becomes relatively large, not enough battery core surface area they provide for laying out (a single) heating fuse strips considering the increase in the battery core volume that has to be kept warm.

It is also appreciated that the same battery surface area to volume ratio being smaller for larger batteries is true for all primary and rechargeable batteries and reserve batteries. A developed method for addressing battery warming with the use of exothermic-based structural units forming strips to wrap around the battery core would therefore benefit all types of batteries for operation on cold and particularly extreme cold environments.

It is, therefore, desirable to provide exothermic-based composite structural units that can be used for significantly increasing the run-time of relatively large batteries, considering the aforementioned limitations of large batteries, such as thermal reserve batteries, in terms of providing enough battery core surface area relative to the battery core volume.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION

Flexible and Rigid Composite Structures with Patterned Pyrotechnic Layers

Figure 1:
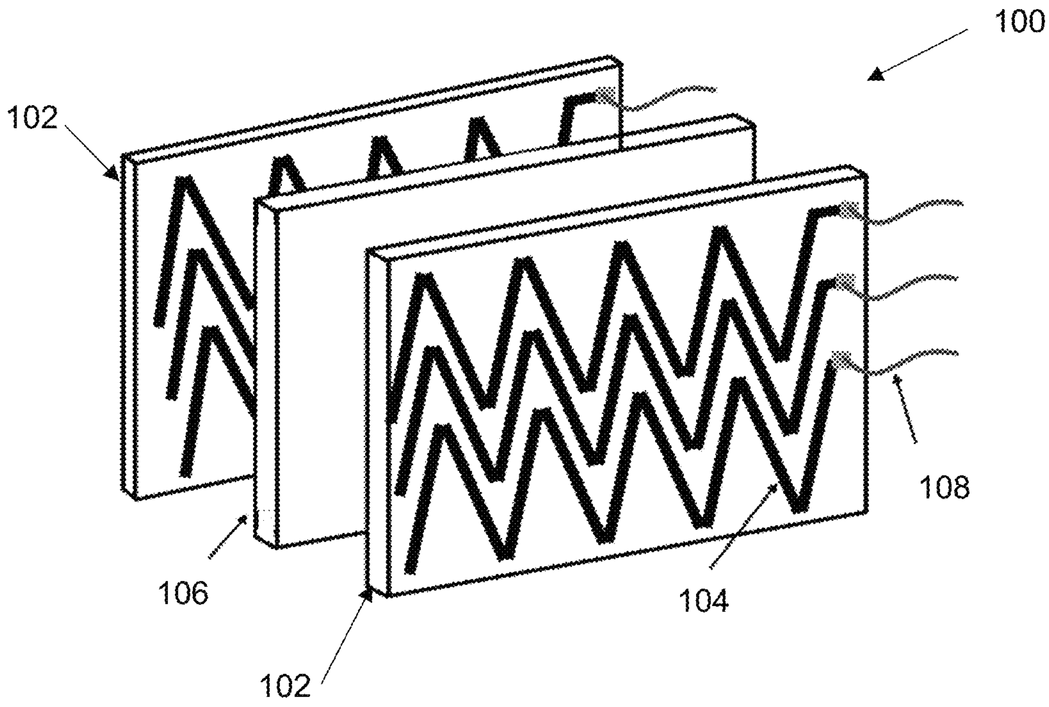
FIG. 1 illustrates a structure of one exothermic-based composite structure for thermal management of munitions components at low temperature.

The schematic of FIG. 1 shows a construction of an exothermic-based composite structure, generally referred to by reference numeral 100. Such composite structure can be flexible since such structures with patterned pyrotechnic layers can be fabricated as sheets or strips or the like for general application to the intended objects. However, the composite structure 100 can also be rigid and load bearing, as described below.

In the schematic of FIG. 1, the exothermic-based composite structure 100 comprises layers of high temperature insulation materials 102 within with patterns of pyrotechnic (or other exothermic material) strips inlays 104 that are separated by thin layers of insulation materials 106.

It is appreciated that strengthening high temperature resistant and low thermal conductivity fibers such as fiberglass may also be provided in the insulation layers 102 as well as the patterned pyrotechnic strip inlays 104 to provide structural strength to the composite structure without adding extra weight.

The patterned pyrotechnic strip inlays 104 are provided with separate initiation bridge-wires 108 or several strip inlays may be connected at the ends or at intermediate points along their lengths to be initiated with a single initiation bridge-wire. Methods that can be used for initiating the patterned pyrotechnic strips, such as the use of bride-wires that are heated electrically, are well known for use in munitions.

The pyrotechnic strip inlays 104 may be prefabricated as a flexible fuse and may be woven into a fibrous insulation layer such as fiberglass or the like. Alternatively, the patterned pyrotechnic strips 104 may be cut out of the insulation layers and the fuse strips (flexible or preformed rigid fuse strip patterns as described in Sections (b)-(d) below) may be inlaid into the provided gaps. When using preformed rigid fuse strip patterns of the type described below, the fuse strips may be laid down as desired on a flat surface and the space between them filled with insulation material particles (or to be dried pasted) to form a flat layer. The layers 102 may be "assembled" directly over the thin insulation layers 106 to minimize or even eliminate the need for any bonding agent.

Figure 2:
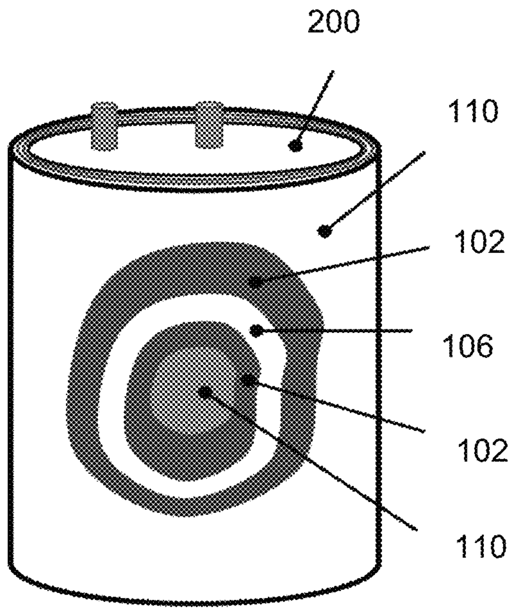
FIG. 2 illustrates an exothermic-based composite structure used for thermal management of a liquid reserve battery.

It is appreciated that the patterned pyrotechnic/exothermic strip inlaid layer 104 and the thin insulation layer 102 may be applied directly to an intended device, such as a liquid reserve battery housing 200, as shown in FIG. 2. In FIG. 2, two patterned pyrotechnic/exothermic strip inlaid layers 102 that are separated by a thin insulation layer 106 and covered by an outer insulation layer 110 are shown to cover the outer housing 112 of a liquid reserve battery 200. The provided patterned exothermic-based composite structure can also be part of the structure of the munition that houses the liquid reserve battery as described below.

It is also appreciated that the exothermic-based composite structure shown in FIGS. 1 and 2 can be provided with as many patterned pyrotechnic/exothermic material strip layers 102 as necessary to achieve the required thermal management goals and the available space of each application. In addition, the composite structure can be configured with insulation filling and insulation layers that are flexible, thereby allowing the fabricated composite sheets to be wrapped around devices and components that require heating on demand at low temperatures.

Figure 3:
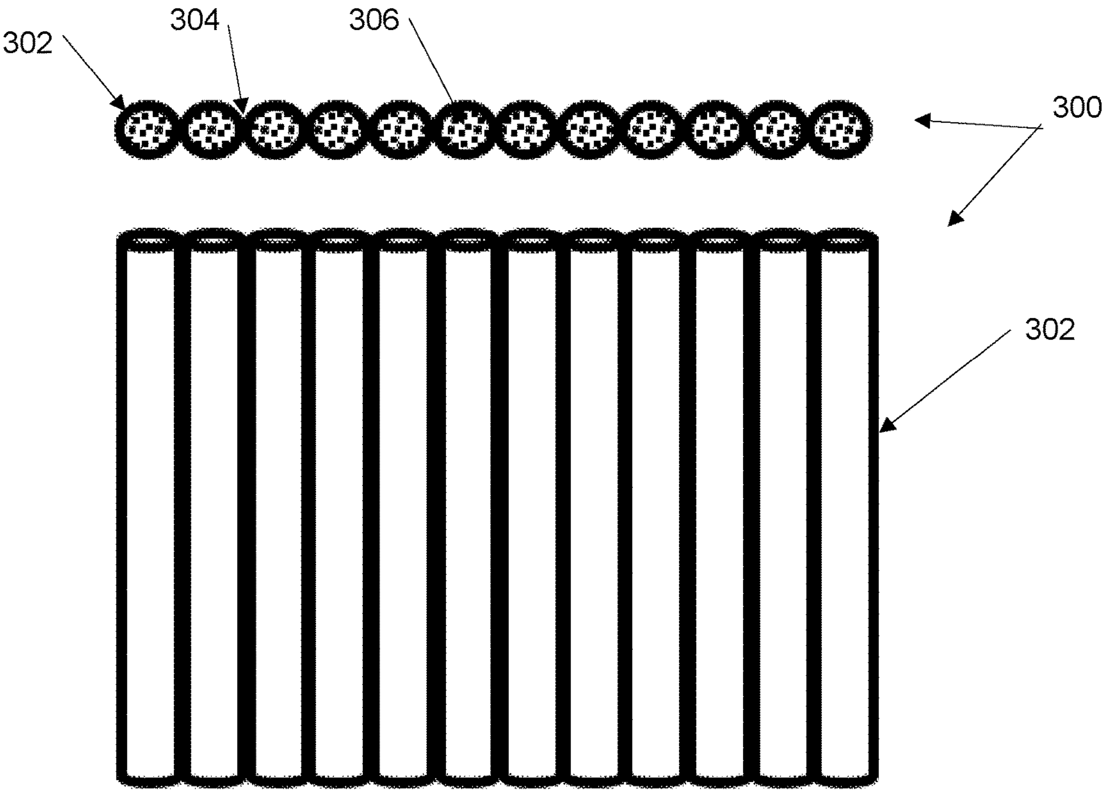
FIG. 3 illustrates a load-bearing exothermic-based composite structure for the construction of various devices with a thermal management heat source.

Rigid Load-Bearing Composite Structures with Pyrotechnic/Exothermic Material Heating Sources A load-bearing composite structures with embedded pyrotechnic/exothermic material heating sources that can be initiated on demand is shown in FIG. 3, generally referred to by reference numeral 300. This composite structure 300 can be used to build the structure of different devices or their support structures and even housing of reserve batteries to provide adaptive heating for their thermal management.

In the load-bearing composite structure of FIG. 3, the structure is shown to consist of relatively thin wall tubes 302 that are welded together side by side at a contact point 304 to form a strong but relatively lightweight plate. Then as can be seen in the top view of FIG. 3, the tubes are filled with compacted pyrotechnic compounds 306 that can be configured to the desired burn speed, temperature and generating heat.

In practice, the pyrotechnic materials 306 filling the tubes 302 can be consolidated. The process of consolidation for the composite structure of FIG. 3 is readily carried out by flattening the tubes 302 under a press. The process reduces the thickness of the composite plate 300 (e.g., reducing a diameter of the tubes 302 in one direction, such as in the direction in and out of the page of FIG. 3). Depending on the application at hand, each tube 302 may be filled with different pyrotechnic material 306. Each tube 302 may be provided with individual initiation mechanism (e.g., electrically heated bridge-wires) to achieve a desired heating pattern or a few may be initiated with a single initiator or all at the same time. The selection of the pyrotechnics can avoid sympathetic ignition.

Figure 4:
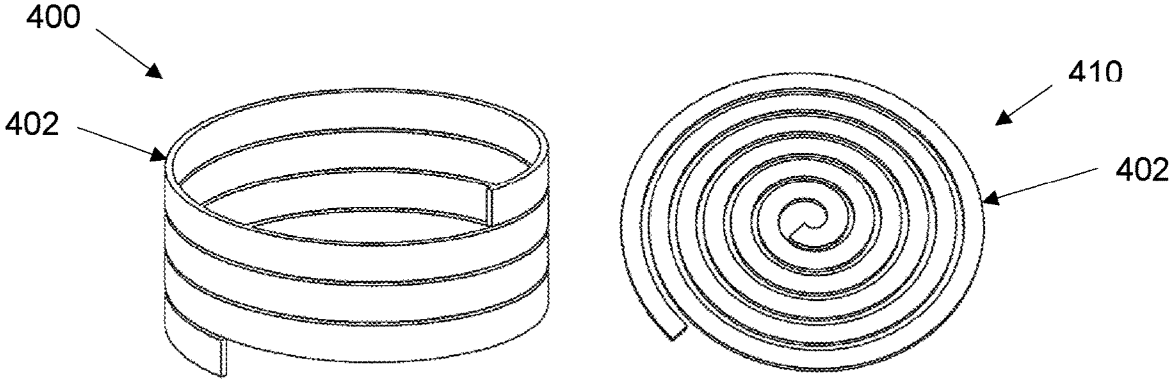
FIG. 4 illustrates embodiments of coil and spirally formed and flattened stainless steel tubes filed with slow burning pyrotechnic material to form heating fuze strips for thermal management of thermal batteries.

The tube(s) 402 can be configured as a slow burning heating fuse strip 400 that can be coiled to be positioned between thermal insulation layers around thermal battery core. The heating fuse strips 402 can be formed by packing slow burning (currently in the order of 3-15 seconds per inch) pyrotechnic material in a thin wall and 0.133 inch outside diameter stainless-steel tube(s) 402. The tube(s) 402 can then be flattened while being coiled to consolidate the pyrotechnic material and make them into a relatively thin wall cylinders to be positioned between thermal insulation layers around the thermal battery core. The top and bottom surfaces of the battery core can also be covered by flattened spiral fuse strips 410 made from the same stainless-steel tube(s) 402 and filled with slow burning pyrotechnic material. Examples of such coil 400 and spiral 410 heating fuse strips are shown in FIG. 4. The heating fuse strips 400, 410 can be integrated into thermal batteries to increase their run time by over one order of magnitude.

The pyrotechnic composite structure (plate) 300 of FIG. 3 can be used in the same process of consolidation described above by simultaneously or in several steps flattening the plate tubes, which although shown in a linear array, can be formed in any shape, such as cylindrical.

It is also appreciated that the initial tubes do not have to be straight and may have been formed into various shapes such as in arc forms or even bent to relatively sharp corners and stacked and welded using laser or electron beam or even brazed together to form the desired structures for various devices as their housing or support structures. The structures will be relatively lightweight and the presence of compacted pyrotechnic material inside the structure would increase damping characteristics of the structure and would make them highly suitable for damping ringing (stress waves) and structural vibration.

Example-1: Application of Rigid Load-Bearing Composite Structures with Pyrotechnic or Other Exothermic Material Heating Sources—Liquid Reserve Battery Thermal Manage As discussed above, the load-bearing composite structure 300 of FIG. 3 with the embedded pyrotechnic/exothermic material 306 as a heating source may also be configured in a variety of shapes. One application for such structure 300 is for munitions, more particularly, for thermal management of liquid reserve batteries used in munitions. Currently available liquid reserve batteries cannot be activated and once activated to operate at temperatures below −40 degrees C. and at temperatures below −10 to zero degrees C. the performance of such batteries degrades significantly. As described below, the proposed load-bearing pyrotechnic and/or other slow reacting exothermic material based composite structure can be readily adapted to address such shortcomings of currently available liquid reserve batteries.

Figure 5:
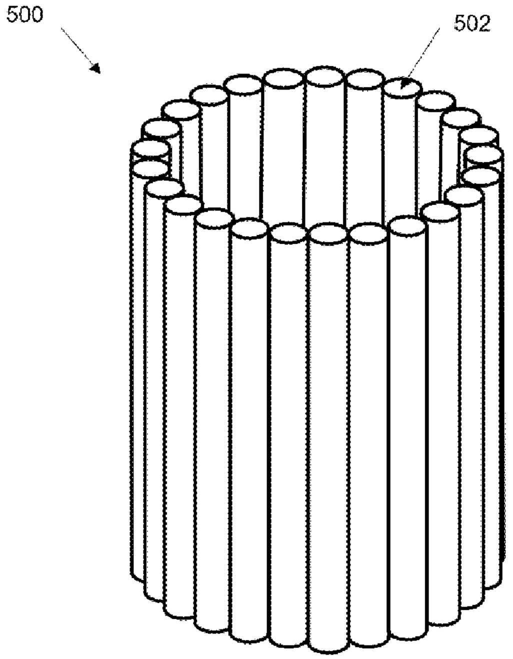
FIGS. 5 and 6 illustrate a cylindrical composite structure with embedded exothermic compound, before and after material compacting, respectively.
Figure 6:
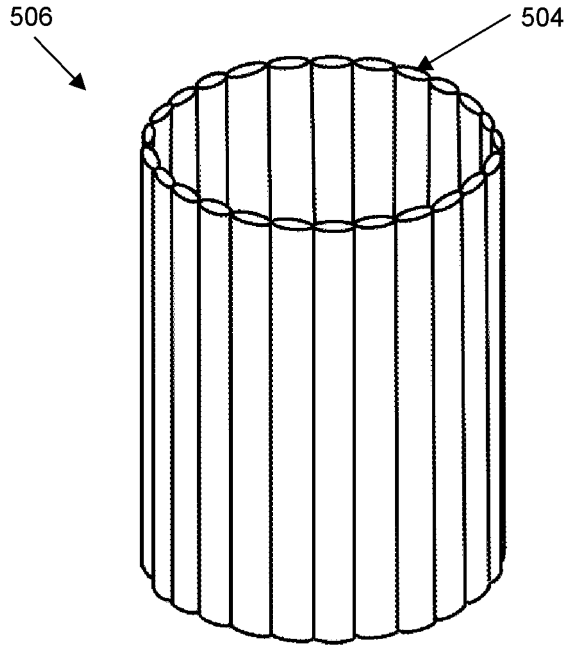

For thermal management of liquid reserve batteries, the battery housing may be constructed with a cylinder 500 of stainless-steel tubes 502 that are welded as described above to form a cylindrical shape as shown in FIG. 5. The individual stainless-steel tubes 502 can then be filled with the same or different pyrotechnic or other exothermic materials. The stainless-steel tubes 502 can alternatively be compacted to the shape 504 as shown in FIG. 6 to form the housing 506. The tube ends may then be provided with individual or grouped initiation bridge wires and sealed with a military grade natural cellulose (NC) or other similar compounds that are commonly used for sealing and protecting energetic materials from the environment.

The resulting sealed structures 500, 506 may then be used as the casing of liquid reserve batteries or as a sleeve disposed around the casing of liquid reserve batteries for thermal management, including rapid pre-heating as needed at low temperatures before activation. The outer surface of the structure 506 can also be provided with an appropriate thermal insulation layer to minimize heat loss into the environment. The pyrotechnic material filled tubes 504 may then be initiated to heat the liquid reserve battery as needed. For example, fast burning pyrotechnics may be used to rapidly heat the battery before activation at low temperatures or slower burning pyrotechnics or slow acting exothermic compounds may be used to keep the liquid reserve battery at its top performance level at low temperatures. Additionally, a select number of the pyrotechnic filled tubes can be have the fast burning pyrotechnics and a select number of tubes can have the slower burning pyrotechnics or slow acting exothermic compounds.

It is also appreciated that helically coiled and welded tube(s) similar to the coil 400 shown in FIG. 4 (left) may also be used for the above purpose, In this case, the helically coiled tube is first formed, then filled with pyrotechnic or other exothermic material and then flattened to compact the filling material and then used as was described above for thermal management of liquid reserve batteries. A double helix tube can be used to form the coil 400 where a first helix tube can have the fast burning pyrotechnics and a second helix can have the slower burning pyrotechnics or slow acting exothermic compounds.

Example-2: Application of Rigid Load-Bearing Composite Structures with Pyrotechnic or Other Exothermic Material Heating Sources—Liquid Reserve Battery Housing As discussed above, alternatively, the cylindrical structures 500, 506 of FIG. 5 or FIG. 6 may be used to construct the actual housing/casing of a liquid reserve battery. In such a composite liquid reserve battery housing, housing caps can be welded to the housing 500, 506 after the housing tubes have been filled with pyrotechnic or other exothermic materials and alternatively, compacted without causing the compacted pyrotechnic materials to initiate.

Figure 7:
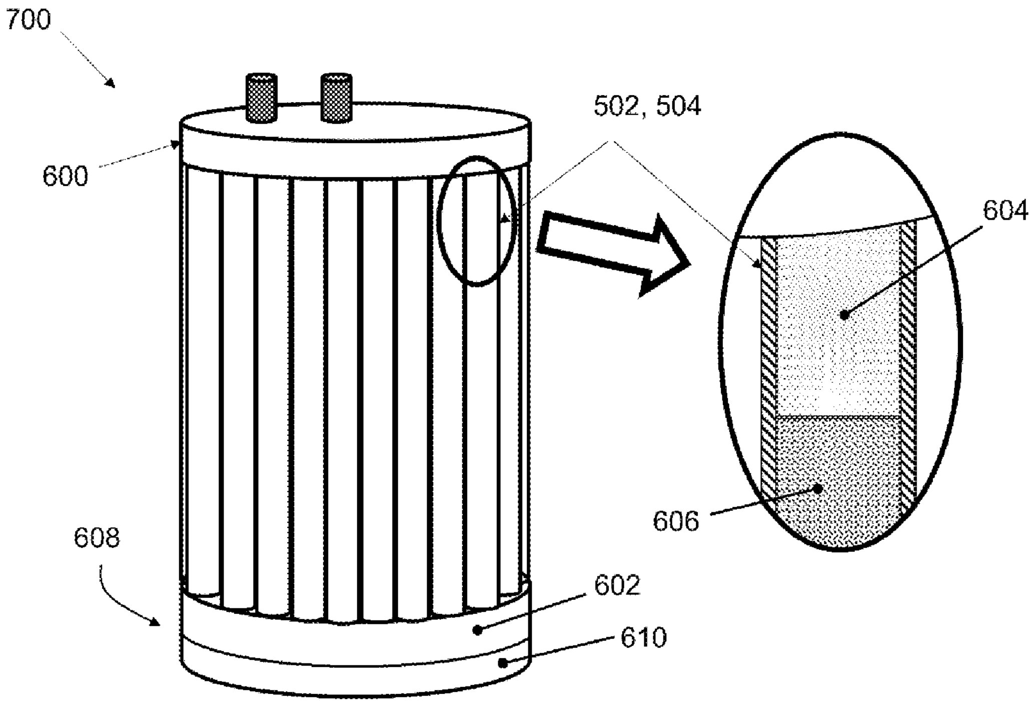
FIG. 7 illustrates a liquid reserve battery housing with a composite structure with embedded exothermic materials for fast activation and thermal management at low temperatures.

The configuration of such composite structure for liquid reserve battery housing and the process of its manufacture is described below. The configuration of the proposed composite structure for liquid reserve battery housing is shown in FIG. 7. In FIG. 7, on the battery terminal cap 600 side, a blow-up cutaway view of one of the sidewall tubes 502, 504 is shown. As can be seen in the blow-up view, the top portion of the pyrotechnic packed tubes 502, 504 is filled with a thermal isolation filling 604, such as alumina[1] as described below to ensure that while welding the top cap to the sidewall, the pyrotechnic filling 606 is not ignited.

[1] Developed as part of a U. S. Army SBIR Phase I and Phase II project, titled: "Novel Actuation Technologies for Guided Precision Munitions", contract number W15QKN-06-C-0016 for preventing sympathetic ignition of propellants in multistage thrusters.

It is noted that in the process of manufacturing liquid reserve batteries, the terminal cap end plate 600 is welded to the sidewall (cylinder 500, 506) as the last step, after all interior components of the battery have been assembled inside the battery housing. For this reason and noting that the common practice is to place thermal heat sinks around the sidewalls to minimize the transfer of heat down the sidewall during the welding process, the provided thermal isolation layer should prevent ignition of the pyrotechnic material during the welding process.

The process of constructing and assembling the battery and its housing with embedded pyrotechnic materials is as follows:

The sidewall 500, 506 of the liquid reserve battery housing is constructed with appropriately sized stainless-steel tubes 502, 504 as was earlier described as shown in FIG. 5. In FIG. 5, the sidewall of the housing is shown to have a cylindrical shape. However, it is appreciated that the sidewall may be configured to have almost any other shape, for example, it may be designed in rectangular or half-moon, oval or even triangular or compound shape to fit the available space in munitions.

The sidewall section 500, 506 is then welded (or brazed or the like) to the housing welded section 602. The housing welded section is provided with holes matching the bore of the tubes 502, 504, through which the internal volume of the tubes can later be accessed. It is noted that after the welding, the interior spaces of the tubes are no longer accessible from the inside of the housing.

Each sidewall tube is provided with the bridge-wire or other activation device on the housing welded section 602 and sealed. The housing welded section 602 is provided with an appropriately sized compartment 608 for housing the bridge-wire and its wirings, which are exited from the side of the housing welded section 602 (not shown in FIG. 7 for clarity) or through the bottom of the battery through an initiation compartment cap 610, depending on the application. The initiation compartment cap 610 is then attached to the housing welded section 602 by fasteners or screwed together or using any other commonly used method.

From their open ends, the sidewall tubes are filled with the selected pyrotechnic and/or other exothermic materials 606 to close (around 0.1-0.2 inch) to the end and compacted and the remaining space is filled with thermal isolation powder 604 (alumina or the like) as shown in the cutaway view of FIG. 7.

The sidewall tubes are alternatively "flattened" to consolidate the pyrotechnic material up to close to the bottom "housing welded section 602. This can be a cold forming processes in which the battery housing is positioned inside a solid holding fixture sized to the outside diameter of the battery housing. The holding fixture can then be turned in the forming machine while a forming roller travels in and out of the housing interior and progressively flattening the sidewall tubes. The top (thermal isolation side) of the sidewall tubes are welded closed The liquid reserve battery components are then assembled inside the battery housing 500, 506 and terminal wires are connected and the top cap 600 is welded to the battery housing 500, 506.

The liquid reserve battery 700 is then ready for use. In general, the battery can be provided with an outside layer of thermal insulation. The embedded pyrotechnic materials can then be initiated as needed, for example before activation and when a high power pulse is needed at low temperatures and for its thermal management.

Once the liquid reserve battery 700 is activated at low temperatures, the methodology described in U.S. Pat. No. 10,063,076, the entire contents of which is incorporated herein by reference, can be used to assist in thermal management of the battery. Such methodology uses electrical energy from the same battery to keep its electrolyte warm and at the desired temperature.

Other Rigid Load-Bearing Composite Structure Geometries with Pyrotechnic/Exothermic Material Heating Sources The rigid and load-bearing composite structures with embedded pyrotechnic and/or other exothermic compounds discussed above are shown to be constructed with stainless-steel tubes with circular cross-sections and/or materials. It is, however, appreciated that the composite structures may also be similarly constructed with tubes having other geometries, for example with rectangular tubes 802 or triangular tubes 804 or a combination of such tube cross-sections as shown in FIG. 8.

Figure 8:
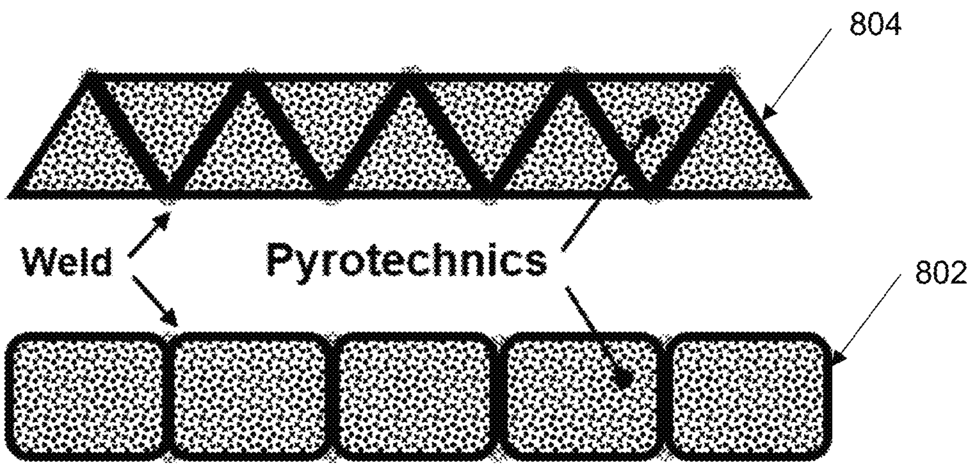
FIG. 8 illustrates cross-sectional views of composite plate structures with embedded pyrotechnics constructed with welded triangular (top) and rectangular (bottom) tubes.

Rigid Load-Bearing Composite Structure Constructed with Phase-Change Metals and Embedded Pyrotechnics for High Heat Capacity The load-bearing composite structures of FIGS. 3 and 8 are shown to be constructed with relatively thin-wall tubes that are welded together side by side to form a strong but relatively lightweight plate or as for the case of composite structures of FIGS. 5 and 6, cylindrical housings. As shown in FIG. 4, the tubes may also be formed in spiral or coiled shapes, which may be welded together to form strong load-bearing structures. The tubes are then filled with pyrotechnic or other exothermic material compounds that can be configured to be initiated to react at a desired speed, temperature and with a prescribed heat generating capacity. The pyrotechnic materials in the individual or groups of tubes can then be initiated adaptively and on-demand for the composite structure to perform its intended thermal management functions.

The thermal management capabilities of the load-bearing composite structures can be increased by using pyrotechnic or other exothermic materials with high heat generating capacity and which generally burn (undergo chemical reaction) slowly. Using such exothermic materials enables thermal management of intended devices over relatively long periods of time without an increase in the overall volume of the composite structure.

One challenge of using high heat generating pyrotechnics in composite structures is their slow burning at high temperatures. High temperature burning creates local high temperature regions and is not generally desirable since it can cause damage. For example, a high heat generating pyrotechnic material may burn at 1000-1200 degrees C., making it unsuitable for use in a composite housing of the liquid reserve battery of FIG. 7 since it may damage the battery core. In addition, to avoid sympathetic ignition of pyrotechnics in adjacent tubes, thermally isolating material (e.g., alumina) filled tubes may have to be positioned between pyrotechnic filled tubes.

Another challenge of using high heat generating pyrotechnics in composite structures in addition to the generated local high temperatures is the relatively rapid cooling of the region due to the generated high temperature gradient.

The pyrotechnic-based composite structures described below addresses both of such challenges of using high temperature and high heat generating pyrotechnics. The pyrotechnic-based composite structures use the process of phase change in which the pyrotechnic generated heat is used to melt an element (e.g., a relatively low melting temperature metal such as aluminum or zinc or tin) and thereby store heat energy in the molten material at a significantly lower temperature than those generated by the pyrotechnic material. The molten material would then slowly conduct the heat to the composite structure at the lower and constant melting temperature until the solidification process ends and the conduction of heat out of the solidified element begins to drop its temperature.

Figure 9:
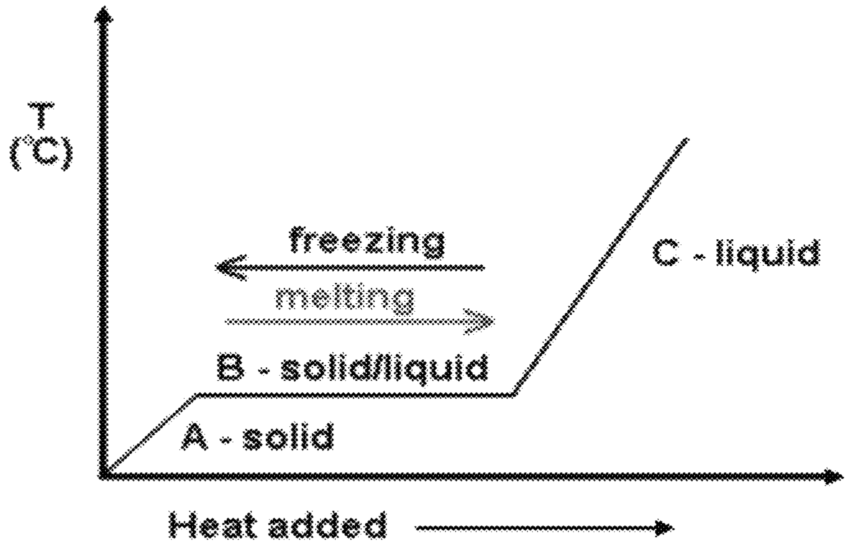
FIG. 9 illustrates a phase-change diagram for a typical substance.

The process of a solid becoming a liquid is called melting (sometimes fusion). The opposite process, a liquid becoming a solid, is called solidification. For any pure substance, the temperature at which melting occurs— the melting point—is a characteristic of that substance. It requires heat energy for a solid to melt into a liquid. During the melting process and as the mixture of solid and liquid is heated, the mixture temperature stays constant as shown in the phase change diagram of FIG. 9. Thereby heat energy is stored in the molten substance. The stored heat is then transferred to the surrounding structure via conduction at a constant (melting point) temperature until the substance has fully solidified. The opposite process is routinely used to keep beverages cool by the addition of ice that melts and keeps the beverage cool at 0 deg. C.

Every pure substance requires a certain amount of energy to change from a solid to a liquid. This amount is called the enthalpy of fusion (or heat of fusion) of the substance, represented as $\Delta H_{fus}$. For example, pure aluminum has a melting temperature of 660 degrees C. and its enthalpy of fusion is $\Delta H_{fus}$=10.7 KJ/mol. Note that the unit of $\Delta H_{fus}$ is kilojoules per mole, the quantity of material is needed to know how much energy is involved. The $\Delta H_{fus}$ is always tabulated as a positive number. However, it can be used for both the melting and the solidification processes (in exothermic solidification process, Ali will be negative).

Figure 10:
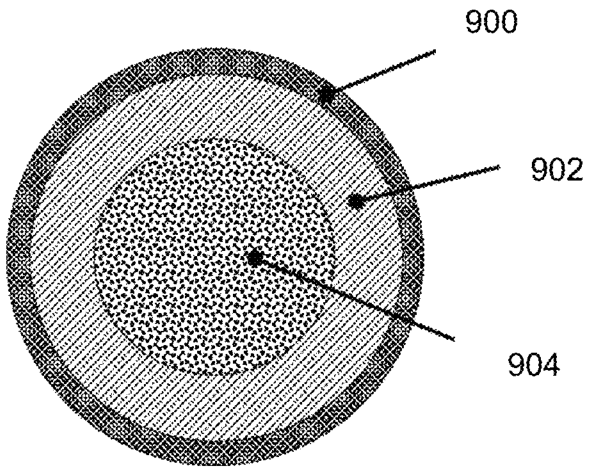
FIG. 10 illustrates a composite structure with phase changing member for heat storage at lower temperatures and for uniform heating in thermal management processes.

The composite structures presented above (e.g., those of FIGS. 5-8) may then be constructed with tubes 900 that are provided with the added phase changing material, such as for example aluminum or zinc or tin—that are melted during the high temperature burning of the pyrotechnic material 904 and thereby store the generated heat at lower temperatures. The cross-sectional view of such a simple composite tube structure is shown in FIG. 10, in which the pyrotechnic material 904 is provided inside a tube 902 formed of, e.g., aluminum, which is then encased in another tube 900 (e.g., formed of stainless-steel) with a significantly higher melting temperature than the material of tube 902 (e.g., aluminum). The composite tube of FIG. 10 may be welded as was previously described together even after pyrotechnic material filling with proper cooling process to any structural shape and flattened if necessary. The resulting composite structures can provide significantly more heat at significantly lower and more uniform temperature for thermal management of the intended devices.

When an exothermic-based composite structure is used to form an enclosure for a reserve thermal battery or a liquid reserve battery or in general, for any primary or rechargeable or reserve battery that has to operate for certain amount of time in a cold and even extremely cold environment, the battery has to be configured and packaged such that no component of the battery, including the battery core, is not subjected to local hot spots and regions.

In general, high temperatures composite structures are desired to maximize the amount of time that the battery core could be made to stay above its minimum operating temperature, for example, above its electrolyte melting temperature for thermal reserve batteries and above freezing temperature of its electrolyte for liquid reserve or Li-ion or Lead-acid or other batteries operating in extreme cold environments. However, direct use of the disclosed exothermic-based composite structures that generate regions or spots of very high temperatures would damage the battery core material and must therefore be avoided.

Figure 11:
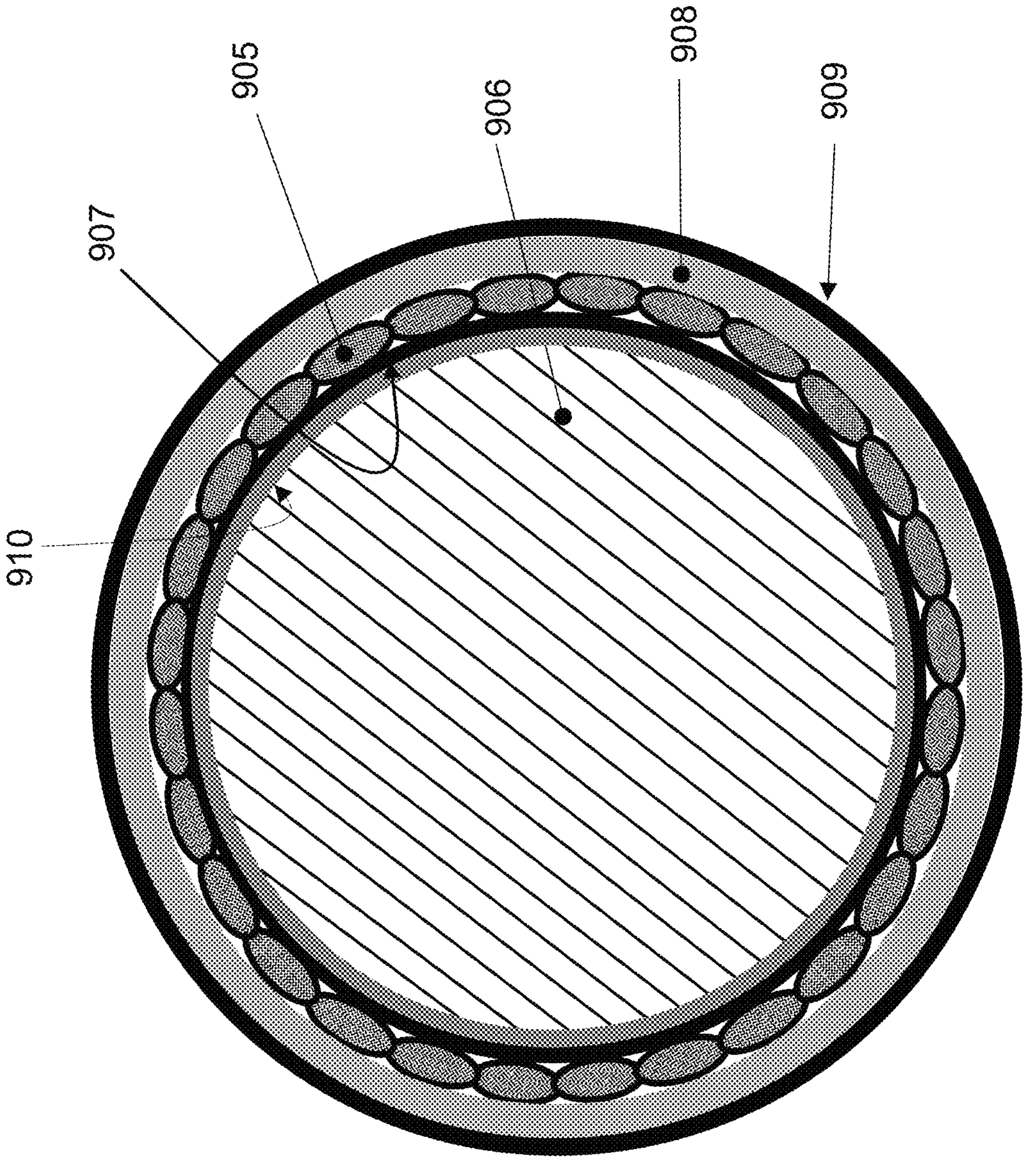
FIG. 11 illustrates the cross-sectional view of one embodiment of a thermal reserve battery that uses the cylindrical composite structure with embedded exothermic compound of FIG. 6.

A configuration of batteries with high temperatures exothermic-based composite structures enclosing their battery core is described below through its application to a commonly used cylindrically shaped battery, the cross-sectional view of which by a plane perpendicular to its long axis is shown in the schematic of FIG. 11. In this example, the exothermic-based composite structures 506 of FIG. 6 is shown to be used to form a cylindrical wall in which the battery core is positioned. In FIG. 11, the pyrotechnic filled and compacted tubes 504 used in the construction of the cylindrical are indicated by numeral 905.

It is appreciated that as the slow burning pyrotechnic material burns inside the flattened tubes 905, since the burning is at very high temperature, with some pyrotechnic materials over 1,500° C. or higher, the battery core surface in contact with the flattened tube surface could experience temperatures that are well above their safe temperatures and could damage the battery core and in some cases cause a violent reaction. In the present embodiment, a relatively thin (usually around 0.01-0.02 inch in thickness) aluminum or copper or the like high thermal conductivity material that can withstand high temperatures, indicated by the numeral 907 in FIG. 11, is provided between the exothermic-based composite structures enclosing surfaces of the flattened tubes 905 and the battery core 906. The provided relatively thin high conducting "foil" layer 907 ensures that the high temperature heat generated in the slow burning pyrotechnic filled and flattened tubes 905 is rapidly conducted away to the surrounding areas of the layer 907, thereby preventing any high temperature spots from forming around the pyrotechnic burning regions of the tubes 905. As a result, the provided thin heat conducting layer would serve to more uniformly distribute heat energy over the surface of the battery core 906, while preventing any hot spots to be forming and damaging the battery core.

It is appreciated that to avoid electrical shorts, a relatively thin layer of high temperature electrical insulation layer, such as Fiberfrax Ceramic Fiber Paper, can also be positioned between the relatively thin heat conducting layer 907 and the battery core 906.

It is also appreciated that in most battery applications, the exothermic-based composite structure forming the cylindrical wall is also covered by a layer of thermal insulation material 908 and then packaged inside an outer housing 909. Similar arrangements are usually made for the top and bottom battery caps, i.e., the battery core is covered on both ends by a similar relatively thin heat conducting material, such as aluminum or copper (over the aforementioned electrical insulation layer), and then provided with the helical flat heating fuse strip, such as the helical fuse 410 of FIG. 4, and similarly covered by a thermal insulation layer and covered by the battery housing top and bottom caps, such as seen in FIG. 2.

The composite structures presented above, for example the sidewall of the battery housing shown in the cross-sectional view of FIG. 11, may also be constructed with tubular units that are provided with phase changing materials, such as the one shown in the cross-section of FIG. 10.

It is, however, appreciated by those skilled in the art that with most pyrotechnic materials, once the tube 902 is filled with the pyrotechnic material and even compacted, there is still a need to consolidate it by pressing the tube 900 towards being "flattened", i.e., take a more oval shape to reduce the volume occupied by the pyrotechnic material 904, thereby consolidating it and preventing its components from separating or settling in the tube 902. This process can be cumbersome, there would be mixing of the burned pyrotechnic material 904 with the melted phase changing material 902, and the oxidizer component of the pyrotechnic material may begin to react with the phase changing material as it melts instead of reacting with the intended components in the pyrotechnic mixture. These shortcomings can be overcome by storing the pyrotechnic material and the phase changing materials in different compartments. This method of configuring composite structure units for the construction of various structures, such as thermal battery housings as described by the cross-sectional view of FIG. 11, is described by its following embodiment of FIGS. 12A-12B and 13A-13B.

Figure 12A:
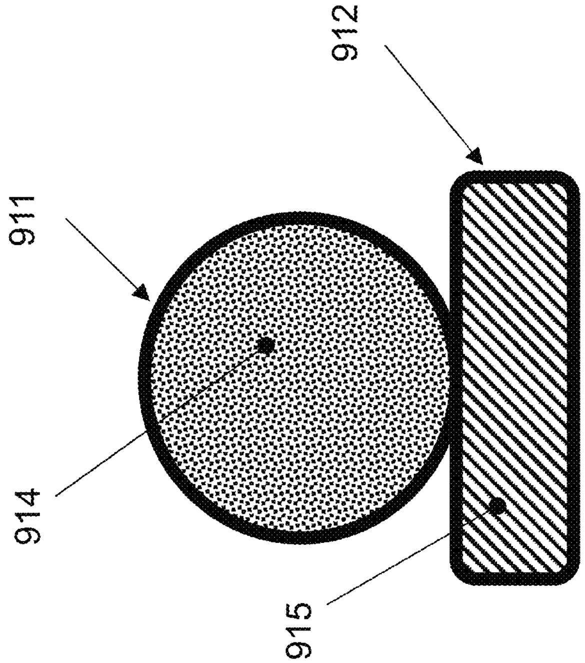
FIG. 12A illustrates a composite structure consisting of two separate compartments, one heating pyrotechnic material tube before consolidating process, and the other filled with the phase changing material for heat storage at lower than pyrotechnic burning temperature for uniform heating in thermal management processes.

The cross-section of the first embodiment of a composite structure with two separate compartments, one heating pyrotechnic material filled tube 911 before its consolidation, and the other 912 filled with the phase changing material 915 for heat storage at lower than pyrotechnic burning temperature is shown in FIG. 12A. Similar to the composite structure unit of FIG. 10, the pyrotechnic material is usually of a slow burning at high temperature, and is compacted in a high temperature resistant, such as stainless steel, relatively thin wall tube. In the cross-section view of FIG. 12A, the pyrotechnic compartment 911 is made with a tube with a circular cross-section. However, any other cross-sections suitable for the following step of pyrotechnic consolidation may also be used. The same is true for the tube 912 for storing the phase changing material, noting that the consolidation must occur under pressure as described below.

Figure 12B:
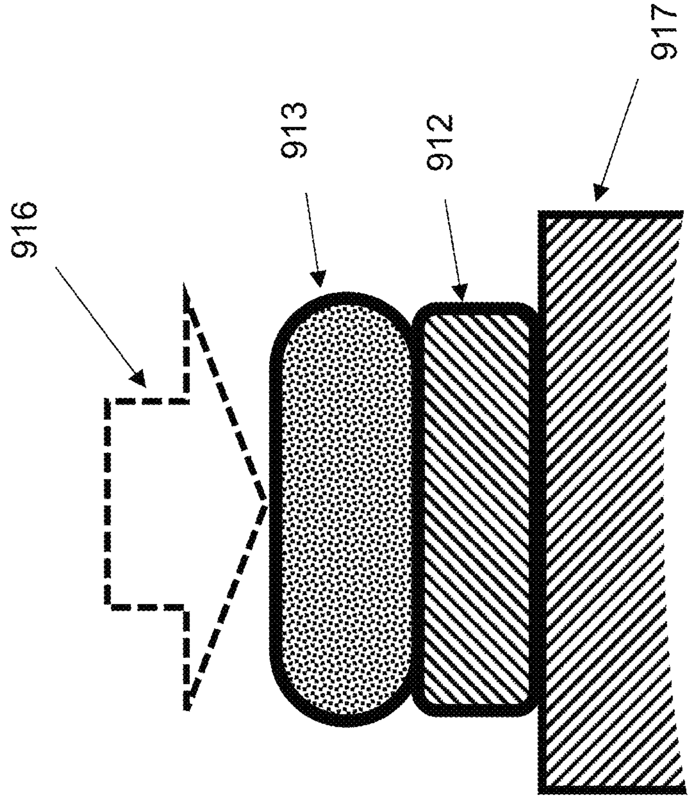
FIG. 12B illustrates the composite structure of FIG. 12A following pyrotechnic material consolidation process via flattening of the pyrotechnic material filled tube over the phase changing material tube for large surface contact to maximum the rate of heat conduction to the phase changing material.

In general, the compartment 911 tube, which is filled and compacted with the slow burning pyrotechnic material 914 is selected to be ductile and readily deformable, such as a well annealed stainless-steel material. The pyrotechnic material 914 is then consolidated by pressing the compartment 911 in the direction of the arrow 916, against the phase change material compartment, which is firmly supported against a rigid surface 917. Then by applying an appropriate amount of pressure as determined by the size of the pyrotechnic material compartment and the pyrotechnic material composition, the pyrotechnic compartment is "flattened" as shown in FIG. 12B, ensuring a large enough contact surface between the two compartments to assist in heat conduction to the phase change material compartment.

Figure 13A:
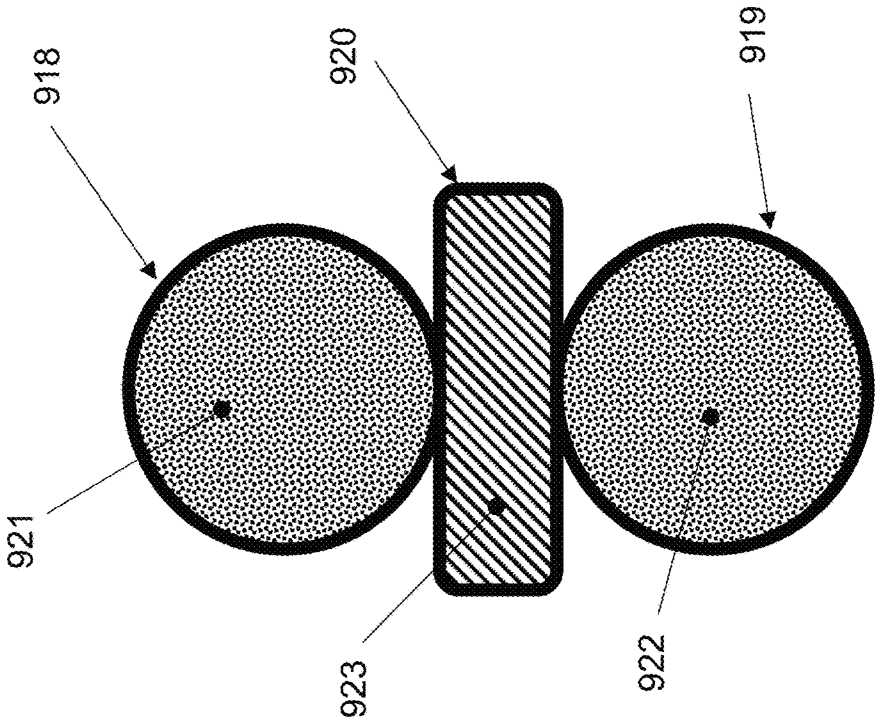
FIG. 13A illustrates a composite structure consisting of two tubular compartments filled with heating pyrotechnic materials before consolidating process, and one compartment filled with phase changing material for heat storage at lower than pyrotechnic burning temperature for uniform heating in thermal management processes.

The cross-section of the second embodiment of a composite structure with three separate compartments, two heating pyrotechnic material filled tubes 918 and 918 before their consolidation, and the other 920 filled with the phase changing material 923 for heat storage at lower than pyrotechnic burning temperature is shown in FIG. 13A. Like the composite structure unit of FIG. 12A, the pyrotechnic material is usually of a slow burning at high temperature, and is compacted in a high temperature resistant, such as stainless steel, relatively thin wall tubes of the compartments 918 and 919. In the cross-section view of FIG. 13A, the pyrotechnic compartments 918 and 919 are filled with pyrotechnic material 921 and 922, respectively, inside tubes with a circular cross-section. However, any other cross-sections suitable for the following step of pyrotechnic consolidation may also be used. The same is true for the tube 920 for storing the phase changing 923.

Figure 13B:
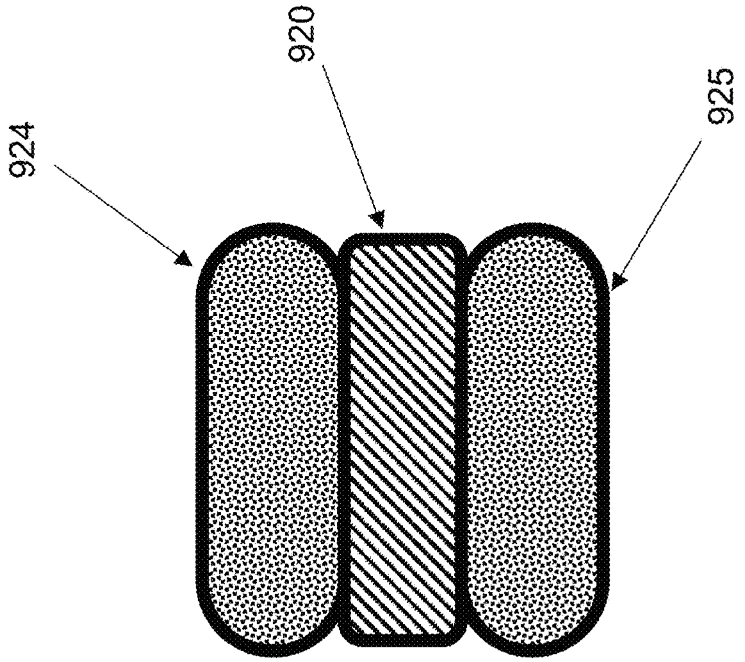
FIG. 13B illustrates the composite structure of FIG. 13A following pyrotechnic material consolidation process via flattening of the pyrotechnic material filled tube by pressing them against the phase change material compartment to maximize heat energy transfer to the phase change material compartment.

In general, the compartments 918 and 919 tubes, which are filled and compacted with the slow burning pyrotechnic material 921 and 922, respectively, are selected to be ductile and readily deformable, such as a well annealed stainless-steel material. The pyrotechnic materials are then consolidated by pressing the compartments 918 and 919 against the phase change material compartment 920. Then by applying an appropriate amount of pressure as determined by the size of the pyrotechnic material compartment and the pyrotechnic material composition, the pyrotechnic compartments are "flattened" as shown in FIG. 13B, ensuring a large enough contact surface between the "flattened" pyrotechnic materials filled compartments 924 and 925 and the surfaces of the phase changing material compartment 920 to assist in heat conduction to the phase change material compartment.

Figure 14B:
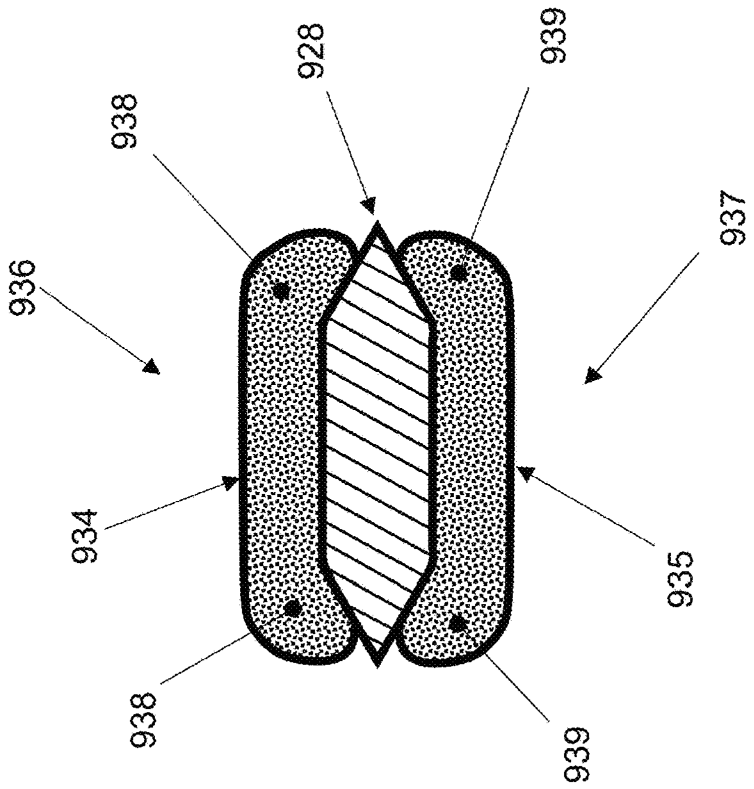
FIG. 14B illustrates the composite structure of FIG. 14A following pyrotechnic material consolidation process via flattening of the pyrotechnic material filled tubes by pressing them against the phase changing material compartment, while maximizing surface contact between them.
Figure 14A:
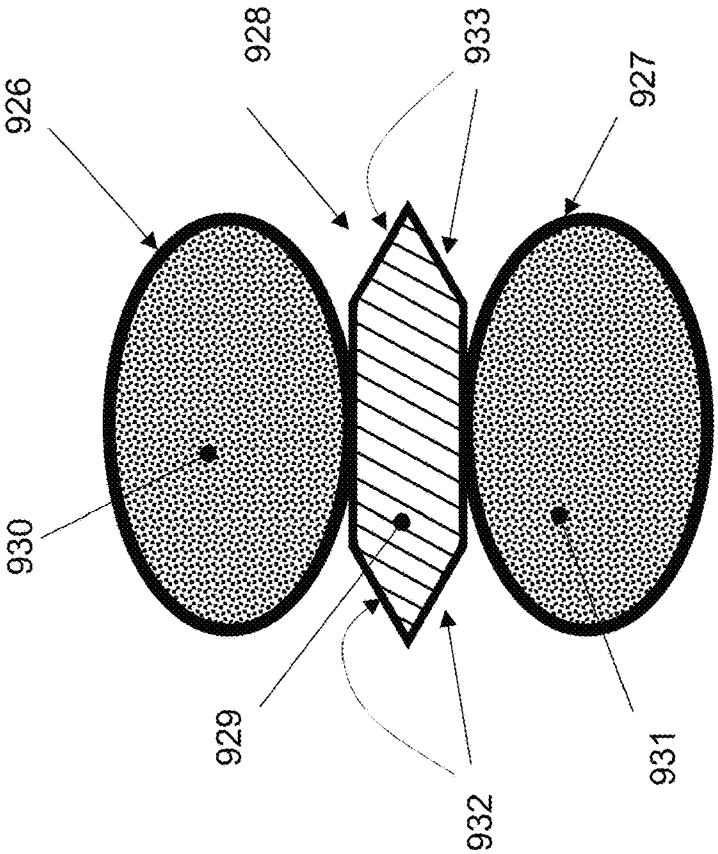
FIG. 14A illustrates a modified composite structure of FIG. 13A, consisting of two tubular compartments filled with heating pyrotechnic materials before consolidating process, and one compartment filled with phase changing material for heat storage at lower than pyrotechnic burning temperature for uniform heating in thermal management processes.

FIG. 14A shows the cross-section of a modified composite structure of FIG. 13A. The modified composite structure also has three separate compartments, two with heating pyrotechnic material filled tubes 926 and 927 before their consolidation, and the other 928, which is filled with the phase changing material 929 for heat storage at lower than pyrotechnic burning temperature. Like the composite structure unit of FIG. 13A, the pyrotechnic material is usually of a slow burning at high temperature, and is compacted in a high temperature resistant, such as stainless steel, relatively thin wall tubes of the compartments 926 and 927. In the cross-section view of FIG. 14A, the pyrotechnic compartments 926 and 927 are filled with pyrotechnic material 930 and 931, respectively, inside tubes with an oval cross-section. However, any other cross-sections suitable for the following step of pyrotechnic consolidation may also be used. The same is true for the tube 928 for storing the phase changing 929.

In general, the compartment 926 and 927 oval tubes, which are filled and compacted with the slow burning pyrotechnic material 930 and 931, respectively, and are selected to be ductile and readily deformable, such as a well annealed stainless-steel material. The pyrotechnic materials are then consolidated by pressing the compartments 926 and 927 against the phase change material compartment 929. Then by applying an appropriate amount of pressure as determined by the size of the pyrotechnic material compartment and the pyrotechnic material composition, the central portions 934 and 935 of the pyrotechnic compartments, indicated by the numerals 936 and 937, respectively, in FIG. 14B, are "flattened" and their sided 938 and 939, are formed over angled sides 932 and 933 of the compartment 928 of the phase changing material as shown in FIG. 14B. As can be seen in FIG. 14B, the pyrotechnic filled compartments 936 and 937 would thereby almost entirely cover the sides of the compartment 928 of the phase changing material, thereby maximizing the amount of heat that is transmitted to the phase changing material for storage and release at lower temperature than the burning pyrotechnic material.

The cross-section of the third embodiment of a composite structure with three separate compartments, two consisting of tubular compartments 941 and 942, filled with phase changing materials 344 and 343, respectively, and one tubular compartment 940, filled with a heating pyrotechnic material 945 before its consolidation. The phase changing material is intended for heat storage at lower than pyrotechnic burning temperature.

Like the composite structure units of FIGS. 12A, 13A and 14A, the pyrotechnic material is usually of a slow burning at high temperature, and is compacted in a high temperature resistant, such as stainless steel, relatively thin wall tubes of the compartment 940.

Figure 15A:
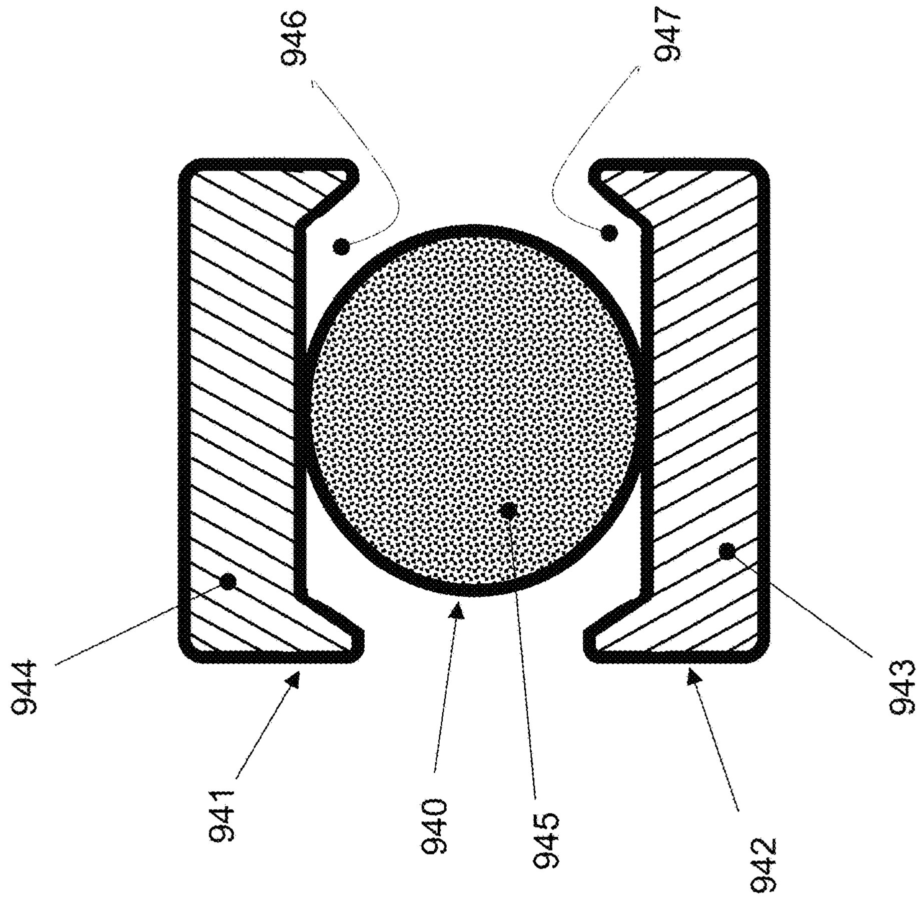
FIG. 15A illustrates another composite structure embodiment consisting of one tubular compartment filled with heating pyrotechnic material before consolidating process, and two compartments filled with phase changing material for heat storage at lower than pyrotechnic burning temperature for uniform heating in thermal management processes.

In the cross-section view of FIG. 15A, the pyrotechnic compartment 940 has a circular cross-section. However, any other cross-sections suitable for the following step of pyrotechnic consolidation may also be used. The same is true for the tubular compartments 941 and 942 of the phase changing material compartments.

Figure 15B:
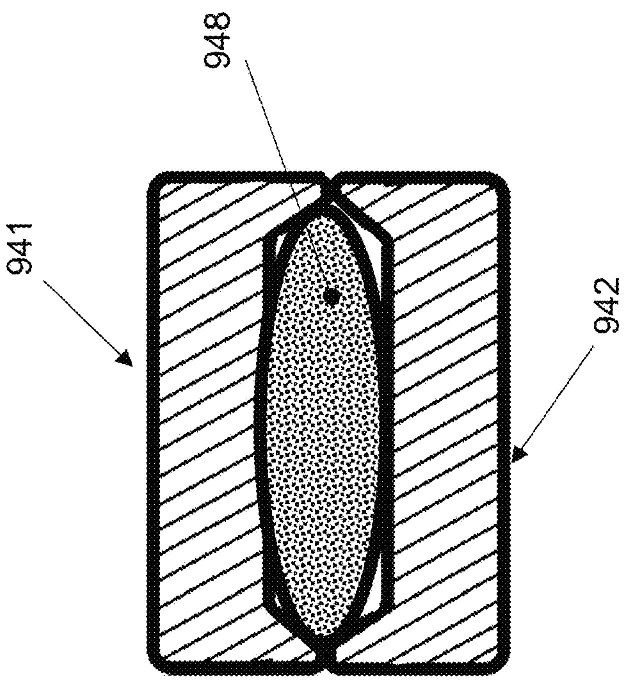
FIG. 15B illustrates the composite structure of FIG. 15A following pyrotechnic material consolidation process via pressing the pyrotechnic material filled tube between the phase changing material compartments to conform to the provided space while consolidating the stored pyrotechnic material to transfer the generated heat energy to the phase changing material compartments.

In general, the compartment 940 tube, which is filled and compacted with the slow burning pyrotechnic material 945 is selected to be ductile and readily deformable, such as a well annealed stainless-steel material. The pyrotechnic materials are then consolidated by pressing the phase changing material compartments 941 and 942 against the pyrotechnic compartment 940. Then by applying an appropriate amount of pressure as determined by the size of the pyrotechnic material compartment and the pyrotechnic material composition, the pyrotechnic compartment is compressed and deformed to fill the space provided between the compartments 941 and 942 by the provided "guide" spaces 946 and 947, respectively, as shown in the schematic of FIG. 15B, in which the deformed compartment 940 with its consolidated pyrotechnic material is indicated by the numeral 948. As can be seen in FIG. 15B, by proper configuration of the shape and size of the "guide" spaces 946 and 947 of the phase changing material compartments 941 and 942, the pyrotechnic compartment is deformed and compressed to fill the provided space between the phase changing compartments 941 and 941, while its pyrotechnic material filling is consolidated the desired level.

As a result, the pyrotechnic compartment surface comes to nearly full contact with the phase changing material compartment surfaces, thereby maximizing the rate of heat transfer into the phase changing material compartments. In addition, all heat energy generated by the burning of the pyrotechnic material is transferred directly into the phase changing material compartments 941 and 942 and their phase changing materials 944 and 943, respectively.

It is appreciated by those skilled in the art that the process of manufacturing the exothermic-based composite structure units of FIG. 15B, the sides of the phase changing material compartments that are brought into contact during the above pyrotechnic consolidation process may be welded or spot welded to facilitate forming the units into coils or helical shapes (FIG. 4).

It is appreciated by those skilled in the art that when space is available for the use of the thicker pyrotechnic-based composite structure units of the embodiment of FIG. 15B as compared to those units of the embodiment of FIG. 12B, the following performance benefits are achieved for the device in which they are used, for example, in thermal reserve batteries to increase the battery run-time:

- By sandwiching the pyrotechnic filled compartment between two phase changing compartments while consolidating the slow burning heating pyrotechnic material as shown in FIG. 15B, the generated heat energy is directly transferred to the phase changing material for storage and transfer to the battery compartments at lower temperature than the burning pyrotechnic as they cool to keep the battery active, i.e., keep the battery electrolyte from solidifying.
- Higher temperature burning pyrotechnic material may be used without the possibility of damaging battery components, therefore more heat energy may be provided in the composite structure units.
- There might no longer be any need for the thermally conductive foil (907 in FIG. 11), since the phase changing material compartment facing the battery core behind the insulation layer (910 in FIG. 11) could function for provide a more uniform temperature to the battery core and prevent hot spots.
- Unlike the embodiment of FIG. 12B, no heat energy with very high temperature gradient is allowed to escape directly from the pyrotechnic material compartment to the battery components or towards the outside environment of the enclosed volume by the pyrotechnic-based composite structure units, which would not contribute to the task of keeping the battery above the melting point of the battery electrolyte.
- Since the heat energy is stored in the phase changing material filled compartments 941 and 942 for later transfer to the battery core and other compartments, the pyrotechnic material does not have to be very slow burning in order to increase the run-time of the battery by effectively partially "replacing" the heat lost by the cooling of the battery core (i.e., also, by reducing the rate of battery core heat loss and reducing the temperature gradient between the battery core and its surrounding surfaces). This means that higher heat generating pyrotechnic materials may also be used in the pyrotechnic material filled compartment 940, even if it burns faster than in other disclosed embodiments of the exothermic-based composite structures and still have the effect of significantly increasing the run-time of the thermal battery.

It is appreciated by those skilled in the art that once the pyrotechnic-based composite structure units shown in FIGS. 12B and/or 13B and/or 15B are formed, they can then be formed into coiled shapes 400 or flat helical shape 410 of FIG. 4 to be assembled into the thermal reserve or other types of battery housings by covering the sides and top and bottom surfaces, respectively, of the battery core, usually over layers of electrical/thermal insulation (like layer 910 in FIG. 11) and high thermal conductivity layer (like layer 907 in FIG. 11) to achieve a more uniform distribution of pyrotechnic generated heat energy as previously described.

It is also appreciated by those skilled in the art that for the case of thermal reserve batteries, the provision of exothermic-based composite structures that can be used to "wrap" around the battery core (for example, over the electrical/thermal insulation and highly conductive heat distributing thin foil layers 910 and 907, respectively, in FIG. 11) to generate heat around the battery core to keep its electrolyte from solidifying as it cools is more effective in increasing the battery run-time for smaller volume batteries. This is the case since smaller the volume of the battery core, larger surface area it would have relative to its volume, i.e., they would have a larger surface area for exothermic-based composite structure strips per unit volume of battery core that needs to be kept warm.

As a result, when a battery becomes relatively large, not enough battery core surface area would be available for laying out (a single) heating exothermic-based composite structure strip to keep the relatively larger volume of the battery core warm. It is also appreciated that the same battery surface area to volume ratio being smaller for larger batteries is true for all primary and rechargeable batteries and reserve batteries.

Herein, the term large batteries are intended to be used for those batteries with available battery core surface area for wrapping exothermic-based composite structure heating strips that are significantly larger than the wrapping (single) strip pyrotechnic material would fully burn too early relative to the required battery run-time. For example, if the battery is required to have a run-time of 3 hours, if the length of the wrapped exothermic-based composite structure heating strip would burn its pyrotechnic material in only 15 minutes, then it would have a very limited capability in significantly increasing the battery run-time.

The following embodiments address battery warming with the use of exothermic-based structural units forming strips to wrap around the battery core for relatively large batteries. Herein, the disclosed embodiments are described by their application to a thermal reserve battery. However, the methods are general, and can be applied to almost any other battery and even super-capacitors, particularly for operating efficiently in cold and even extreme cold environments.

Figure 16:
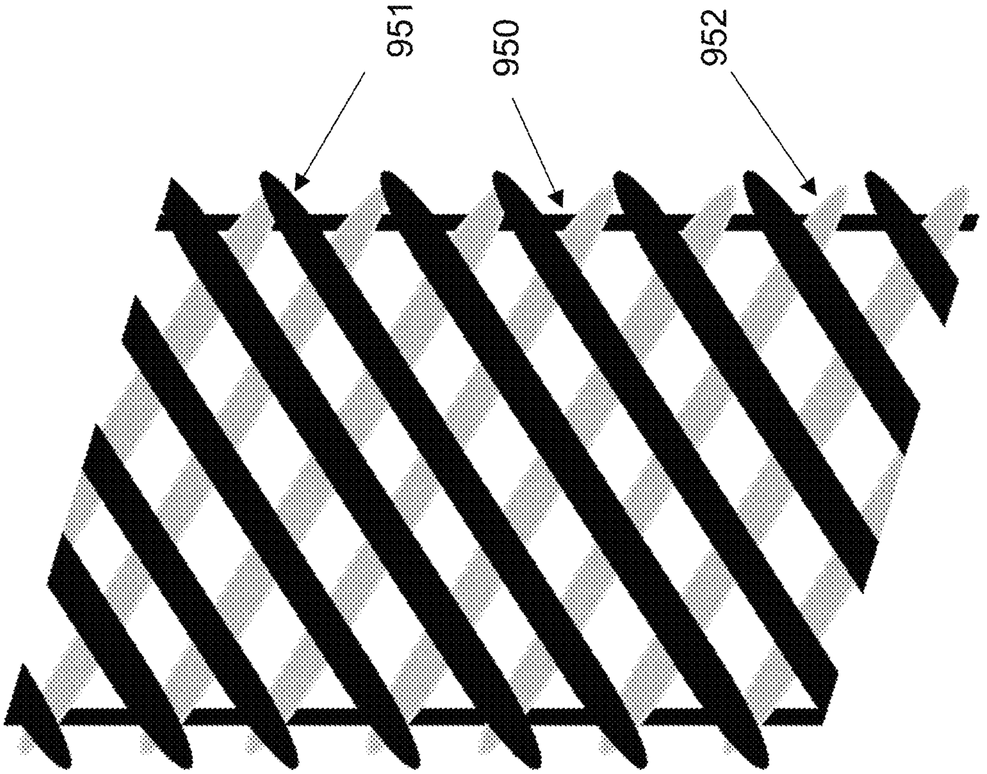
FIG. 16 illustrates a one method of wrapping multiple above disclosed pyrotechnic-based heating strips around the battery core assembly of a thermal reserve battery without causing sympathetic ignition.

In one method, more than one exothermic-based composite structure unit heating strips are wrapped around the battery core (in place of a single wrapping of the coils and helical shaped flat strips shown in FIG. 4). The layers can be crisscrossed as shown in the schematic of FIG. 16 to minimize the time that the burning strip section is in contact with the second layer to avoid sympathetic ignition of the pyrotechnic material in the second layer. A relatively thin layer of thermal insulation may be provided at these junctions when needed depending on the type of heating strip design is being used as described below.

In FIG. 16, the frontal view of a section of the battery surface (e.g., surface of the insulation layer 907 in FIG. 11) over which two layers of pyrotechnic-based heating strips (one or a combination of the designs of FIG. 4, 12B, 13B, 14B or 15B) are wrapped in a crisscrossed pattern is shown. The layer 950 (e.g., surface of the insulation layer 907 in FIG. 11) is shown with a first layer 952 (shown in lighter grey color), over which a second layer 951 (in black color) is provided. It is appreciated that as can be seen in FIG. 16, the crisscrossed pattern results in relatively short contact lengths between the two pyrotechnic-base heating strips, which would minimize the chances of the first layer igniting the pyrotechnics of the second layer, even when no phase changing compartments are positioned between the two layers as described below. In general, if there is a chance for such sympathetic ignition, a very thin conducting material, similar to the layer 907 in FIG. 11, or a thin insulation layer, similar to the layer 910 in FIG. 11, may be provided between the two pyrotechnic-based heating strips 951 and 952. It is also appreciated that even though only two layers of pyrotechnic-based heating strips are shown in the schematic of FIG. 16, more layers may also be similarly employed.

It is appreciated by those skilled in the art that as it was indicated above, one or a combination of the designs of FIG. 4, 12B, 13B, 14B or 15B may be used as the pyrotechnic-based heating strips 951 and 952 to wrap around the battery core and in a similar crisscrossed pattern on the top and bottom ends of the battery where space allows. The selection and their arrangement and the size of the pyrotechnic and phase changing material compartments is dependent on the size and type of the battery as well as the environmental conditions and the required battery run-time.

It is also appreciated by those skilled in the art that in some battery applications, no phase changing material compartment may be necessary, at least in one of the pyrotechnic-based layers and consolidated pyrotechnic filled compartment (strip) may be used directly.

Figure 17:
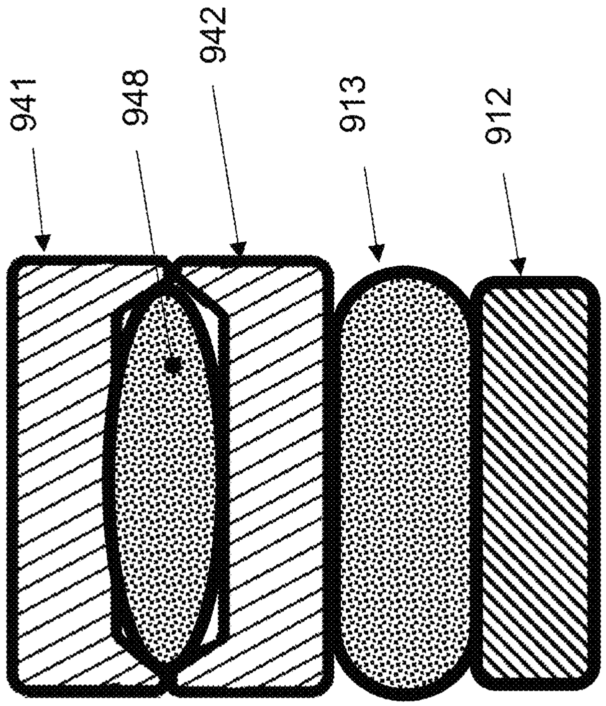
FIG. 17 illustrates one example of how to stack multiple number of above disclosed pyrotechnic-based heating strips to achieve the desired heat generation and phase changing material combination for a given battery application.

It is also appreciated by those skilled in the art that two or more pyrotechnic-based strip designs of FIG. 4, 12B, 13B, 14B or 15B may be stacked while being coiled or formed into flat helical shapes as shown in FIG. 4 co cover the sides and top and bottom surfaces of a commonly used cylindrical battery core. For example, the strips shown in FIGS. 12B and 15B may be stacked to form three phase changing material filled compartments with intermediate consolidated pyrotechnic material compartments as shown in FIG. 17.

It is also appreciated by those skilled in the art that when multiple pyrotechnic-based heating strips are wrapped around the battery core as it was described above, the pyrotechnic material of each heating strip layer may be ignited at different time or at the same time from one end, both ends, or one or more mid-points, depending on the thermal management strategy that is being used. For example, for larger diameter and length batteries, the heating strip pyrotechnics may have to be ignited from multiple points along the strip so that the entire battery core could be kept above the required operating temperature of the battery, particularly if very slow burning pyrotechnic materials are used in the heating strips. In another example, when large enough phase changing material volume is provided in the pyrotechnic-base heating strips, then faster burning and higher heat energy generating pyrotechnic material may be used to belt the phase changing materials of the heating strips and let the stored heat energy keep the battery core temperature at the desired operating temperature of the battery the desired length of time.

It is appreciated by those skilled in the art that when the phase changing material of the pyrotechnic-base heating strips is used as the means of storing heat at the limit of its meting temperature, then the mechanism of extending the battery run-time is by the reduction of the temperature gradient between the battery core and its surrounding contact area, thereby reducing the rate at which the battery core looses its heat energy and its temperature would therefore drop.

It is also appreciated by those skilled in the art that by providing the means of initiating the pyrotechnic material of the pyrotechnic-based heating strips of various type disclosed above, the run-time of the battery can be increased even further than if they are initiated at the time of battery initiation. This is the case since when the battery core temperature is not at its peak temperature and closer to its electrolyte solidification temperature, then the heating strip generated heat would be at higher temperature and would be conducted into the battery and at the same time while the battery core temperature is dropping, the heating strip generated heat is not conducted to the outside environment.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An energy storage system comprising:

an energy storage device comprising a battery core and outer casing; and a heating device at least partially surrounding an outer periphery of the battery core, the heating device comprising:

a first compartment having a heating pyrotechnic material disposed therein; and a second compartment having a phase changing material disposed therein;

wherein the first compartment having a first surface that contacts at least a portion of a second surface of the second compartment;

wherein:

the first compartment being formed of a first material having a first rigidity;

the first compartment being compressed to deform a first cross-section shape of the first compartment into a second cross-section shape;

the second compartment formed of a second material having a second rigidity, the second rigidity being greater than the first rigidity; and wherein an amount of contact between the first surface and the second surface is greater for the second cross-section shape than the first cross-section shape.

2. The energy storage device of claim 1, wherein the heating device being arranged between the battery core and the outer casing.

3. The energy storage device of claim 1, further comprising a metal foil arranged between the heating device and the battery core.

4. The energy storage device of claim 1, further comprising thermal insulation arranged between one or more of the heating device and the battery core and the heating device and the outer casing.

5. The energy storage device of claim 1, wherein the energy storage device is a thermal battery.

6. The energy storage device of claim 1, wherein one or more of the first compartment and the second compartment are configured as an elongated tube.

7. An energy storage system comprising:

an energy storage device comprising a battery core and outer casing; and a heating device at least partially surrounding an outer periphery of the battery core, the heating device comprising:

a first compartment having a heating pyrotechnic material disposed therein; and a second compartment having a phase changing material disposed therein;

wherein the first compartment having a first surface that contacts at least a portion of a second surface of the second compartment;

wherein:

the first compartment comprises a plurality of first compartments each having the heating pyrotechnic material disposed therein, each of the plurality of first compartments being configured as a first elongated tube;

the second compartment comprises a plurality of second compartments each having the phase changing material disposed therein, each of the plurality of second compartments being configured as a second elongated tube; and the first elongated tubes and the second elongated tubes being arranged to at least partially surround the outer periphery of the battery core.

8. The energy storage device of claim 7, wherein the first elongated tubes and the second elongated tubes are arranged in a crisscross pattern.

9. An energy storage system comprising:

an energy storage device comprising a battery core and outer casing; and a heating device at least partially surrounding an outer periphery of the battery core, the heating device comprising:

a first compartment having a heating pyrotechnic material disposed therein; and a second compartment having a phase changing material disposed therein;

wherein the first compartment having a first surface that contacts at least a portion of a second surface of the second compartment;

further comprising a third compartment having the heating pyrotechnic material disposed therein, the third compartment having a third surface that contacts at least a portion of the second surface of the second compartment.

10. An energy storage system comprising:

an energy storage device comprising a battery core and outer casing; and a heating device at least partially surrounding an outer periphery of the battery core, the heating device comprising:

a first compartment having a heating pyrotechnic material disposed therein; and a second compartment having a phase changing material disposed therein;

wherein the first compartment having a first surface that contacts at least a portion of a second surface of the second compartment;

further comprising a third compartment having the phase changing material disposed therein, the third compartment having a third surface that contacts at least a portion of the second surface of the second compartment.

11. A heating device for use with an energy storage device, the heating device comprising:

a first compartment having a heating pyrotechnic material disposed therein; and a second compartment having a phase changing material disposed therein;

wherein the first compartment having a first surface that contacts at least a portion of a second surface of the second compartment;

the first compartment being formed of a first material having a first rigidity;

the first compartment being compressed to deform a first cross-section shape of the first compartment into a second cross-section shape;

the second compartment formed of a second material having a second rigidity, the second rigidity being greater than the first rigidity; and an amount of contact between the first surface and the second surface is greater for the second cross-section shape than the first cross-section shape.

12. The heating device of claim 11, wherein one or more of the first compartment and the second compartment are configured as an elongated tube.

13. The heating device of claim 11, wherein:

the first compartment comprises a plurality of first compartments each having the heating pyrotechnic material disposed therein, each of the plurality of first compartments being configured as a first elongated tube; and the second compartment comprises a plurality of second compartments each having the phase changing material disposed therein, each of the plurality of second compartments being configured as a second elongated tube.

14. The heating device of claim 13, wherein the first elongated tubes and the second elongated tubes are arranged in a crisscross pattern.

15. The heating device of claim 11, further comprising a third compartment having the heating pyrotechnic material disposed therein, the third compartment having a third surface that contacts at least a portion of the second surface of the second compartment.

16. The heating device of claim 11, further comprising a third compartment having the phase changing material disposed therein, the third compartment having a third surface that contacts at least a portion of the second surface of the second compartment.

* * * * *